(No Model.)
J. LEITH.
CONDUCTOR FOR ELECTRICAL DECOMPOSING TANKS.
No. 556,854.                        Patented Mar. 24, 1896.
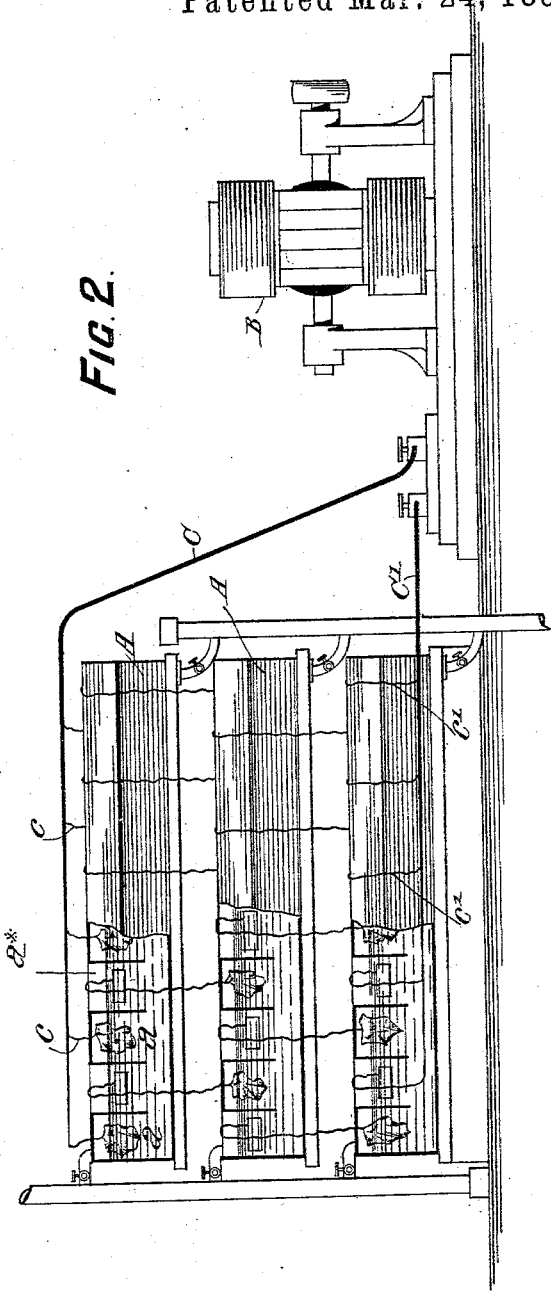
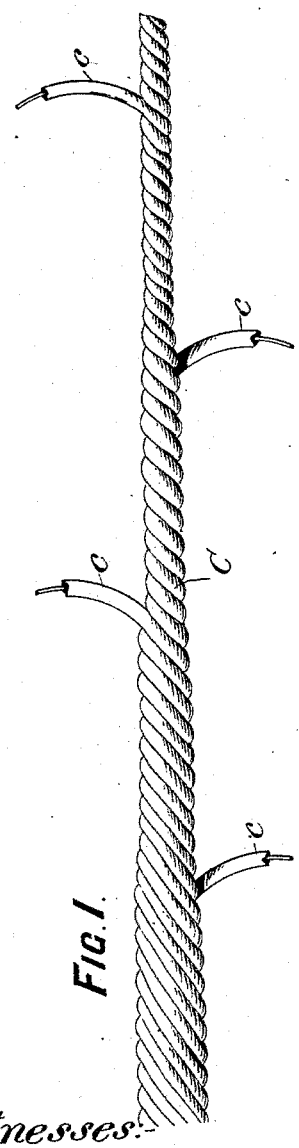
Witnesses:
Fred Haynes
George Barry Jr.
Inventor:-
John Leith
by attorneys
Brown & Seward

UNITED STATES PATENT OFFICE.

JOHN LEITH, OF ST. HELEN'S, ENGLAND, ASSIGNOR TO THE ELECTRO-CHEMICAL COMPANY, LIMITED, OF SAME PLACE.

CONDUCTOR FOR ELECTRICAL DECOMPOSING-TANKS.

SPECIFICATION forming part of Letters Patent No. 556,854, dated March 24, 1896.

Application filed November 20, 1895. Serial No. 569,499. (No model.)

*To all whom it may concern:*

Be it known that I, JOHN LEITH, of the Electro-Chemical Company's Works, St. Helen's, Lancashire, England, have invented an Improved System of Conductors for Electrical Decomposing-Tanks, of which the following is a specification.

In tanks used for the electrolytic decomposition of solutions containing a number of electrodes of opposite polarity it is customary to connect together, by means of a conductor of suitable capacity, all the anodes or positive electrodes, and likewise all the cathodes or negative electrodes, and to attach these conductors to the terminals of the dynamo-electric machine or other current-generator. This method of establishing connections is expensive, owing to the weight of the conductors, which are commonly in the form of solid bars of copper extending the whole length of the tanks. Where a number of tanks are used in an installation the cost of the conductors is very large.

The object of the present invention is, primarily, to reduce the cost of an installation by employing a less expensive system of conductors than heretofore.

In carrying out my invention I adopt for leading the current from the generator a conductor composed of a number of wires or strips which are individually connected to the anodes of the tank, there being as many wires or strips as anodes. The wires may be insulated and gathered together to form a cable, the strands or wires from which are in turn separated from the rest, to be attached severally to the electrodes, so that the cable is gradually tapered off as each connection is made until a single wire only remains for attachment to the last electrode. The return-conductor from the tank to the generator is similarly arranged and connected wire by wire to the cathodes.

In an installation of several tanks it will not be necessary to provide two tapered cables for each tank, but the tanks may be coupled together, so that a pair of cables will do for all.

It is in such installation of tanks so coupled that my invention consists.

Figure 1 of the accompanying drawings shows a portion of a taper-cable composed of a number of insulated wires or strands. Fig. 2 is a diagram showing a series of electrolytic tanks coupled together and connected to a dynamo-electric machine according to my invention by means of such taper-cables.

The plant or installation comprises a number of electrolytic tanks A arranged near together. In the diagram they are shown one over the other. The solution to be electrolyzed is contained in these tanks, and the electric current for effecting the decomposition is led from the dynamo-electric machine B by a taper-cable C, built up of as many strands or wires $c$ as there are positive electrodes or anodes in the first tank. The return-current is led back to the dynamo-machine by a similar cable $C'$, containing separate wires $c'$, connected individually to the negative electrodes or cathodes of the last tank. The intermediate tanks of the series may be coupled in a manner similar to that adopted in coupling the cells of a primary battery, as will be hereinafter more fully explained.

The coupling up of the tanks before mentioned is diagrammatically illustrated at Fig. 2.

Taking the topmost tank as No. 1, the cable of the dynamo-machine being connected to the anodes in the cells $a$, the current passes from these to the cathodes $a^*$ of the same tank. The cathodes of tank No. 1 are coupled to the anodes of No. 2 tank by suitable wires. The cathodes of tank No. 2 are coupled by wires to the anodes of tank No. 3, and so on to the last tank, however many there may be. The cathodes of the last tank are joined up with the wires of the return-cable, as already explained, so that the circuit is complete.

By the employment of the taper-cables and of the method described of coupling the tanks I am enabled to reduce considerably the weight of copper conductor which has hitherto been customarily employed in electrolytic installations. Hence a great economy in construction is effected.

What I claim is—

The system of electrolytic installation hereinbefore described, comprising a series of tanks for the electrolyte, divided into positive and negative cells arranged alternately, and comprising conductors leading to and from the generator, the wires from which conductors are severally connected to the anodes and cathodes of the first and last tank respectively of the series, the cathodes of the first tank being coupled to the anodes of the second tank, and the cathodes of the second tank to the anodes of the third tank, and so on throughout the series.

Dated the 18th day of October, 1895.

JOHN LEITH.

Witnesses:
 HY. LINDON RILEY,
 THOMAS H. LAWLESS.